Oct. 9, 1934.  W. D. ARCHEA  1,976,105
MILLING MACHINE
Filed Feb. 24, 1931  5 Sheets-Sheet 1

Inventor
WALTER D. ARCHEA
By H. K. Parsons
Attorney

Oct. 9, 1934.  W. D. ARCHEA  1,976,105
MILLING MACHINE
Filed Feb. 24, 1931  5 Sheets-Sheet 2

Inventor
WALTER D. ARCHEA
By AHKParsons
Attorney

Oct. 9, 1934.   W. D. ARCHEA   1,976,105
MILLING MACHINE
Filed Feb. 24, 1931   5 Sheets-Sheet 3

Inventor
WALTER D. ARCHEA
By H. K. Parsons
Attorney

Oct. 9, 1934.  W. D. ARCHEA  1,976,105
MILLING MACHINE
Filed Feb. 24, 1931  5 Sheets-Sheet 4
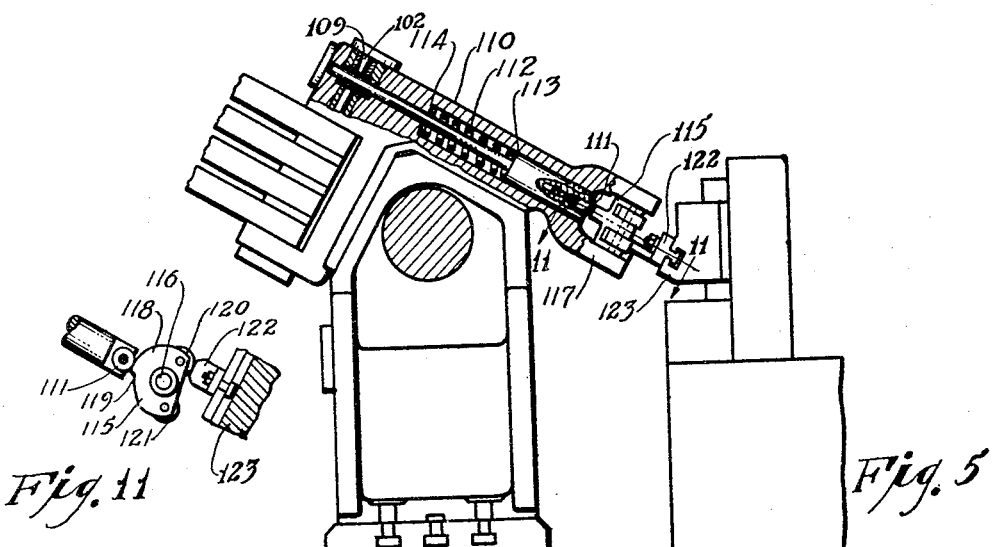
Fig. 11
Fig. 5
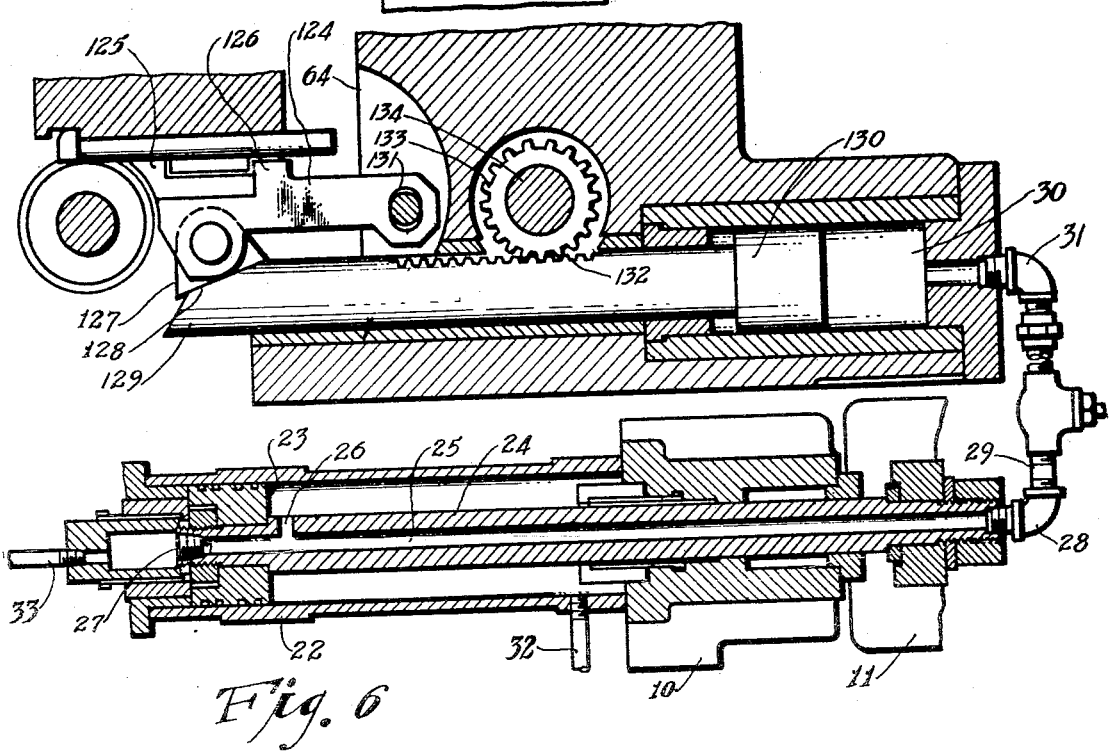
Fig. 6
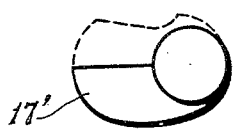
Fig. 14
Inventor
WALTER D. ARCHEA
By AHParsons
Attorney Inventor
WALTER D. ARCHEA
By A.H. Parsons
Attorney Patented Oct. 9, 1934

1,976,105

UNITED STATES PATENT OFFICE 1,976,105

MILLING MACHINE

Walter D. Archea, Cincinnati, Ohio, assignor to The Cincinnati Milling Machine Company, Cincinnati, Ohio, a corporation of Ohio Application February 24, 1931, Serial No. 517,734

21 Claims. (Cl. 90—21.5)

This invention relates to milling machines and more particularly to an improved automatic production machine.

One of the objects of this invention is to provide an improved machine tool operable in successive automatic cycles for finishing a plurality of work pieces with each cycle of operation of the machine.

Another object of this invention is to insure against movement of work during a machining operation by providing improved work holding means in which the clamping or gripping pressure will automatically vary in accordance with variations in the feeding pressure whereby an increase in the feeding pressure will be met by an increase in the clamping pressure.

A further object of this invention is to simplify and reduce the amount of clamping mechanism in a continuous production machine tool by providing simplified means for clamping the work to its carrier during conveyance to a processing station and auxiliary relatively high pressure means at the station for cooperating with the carrier to hold the work during the actual processing.

An additional object of this invention is the provision of improved pressure clamping means in conjunction with work fixtures that may be utilized in connection with pressure actuated slides for automatically effecting clamping of the work during actuation of the slide in one direction and unclamping during actuation in another direction.

Other objects and advantages of the present invention should be readily apparent by reference to the following specification considered in conjunction with the accompanying drawings illustrative of one embodiment thereof, but it will be understood that any modifications may be made in the specific structural details hereinafter disclosed, within the scope of the appended claims, without departing from or exceeding the spirit of the invention.

Referring to the drawings in which like reference numerals indicate like parts:

Figure 5 is a section on the line 5—5 of Figure 4.

Figure 6 is a longitudinal section through the table actuating and clamp actuating cylinders.

Figure 11 is a detail of the work positioner operating cam, as viewed on the line 11—11 of Figure 5.

Figure 14 is an end view of a work piece finished in this machine.

Figure 12:
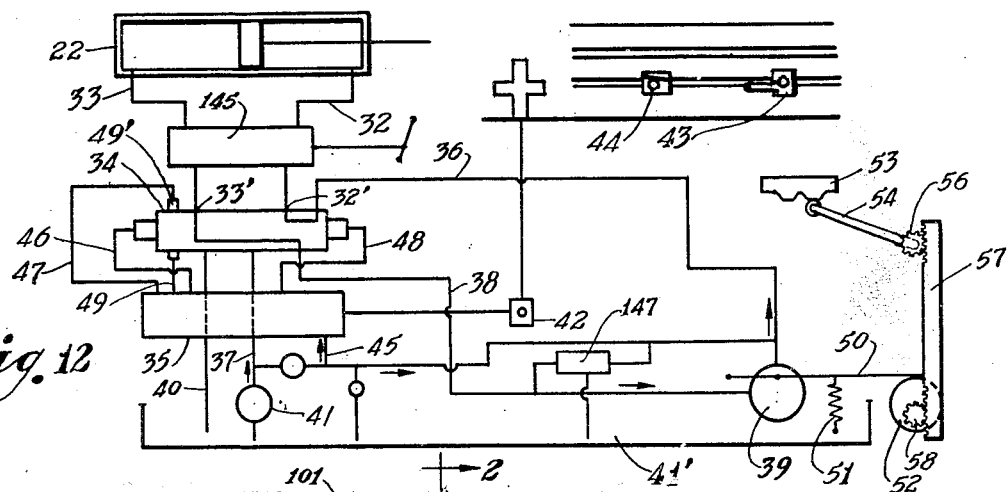
Figure 12 is a diagrammatic view of the hydraulic system.

The reference numeral 10 indicates the bed of the machine upon which is reciprocably mounted the work table 11. A column 12 rises from the rear of the bed and has guideways thereon for supporting a spindle carrier 13 in which is journaled a cutter spindle 14 for rotating an arbor 15 to which is keyed a plurality of cutters 16 for simultaneously milling a plurality of similar work pieces 17. The outboard end of the cutter spindle is journaled in a bushing 18 mounted in the bearing block 19 which is secured to the bracket 20 for vertical adjustment with respect to the outboard support 21.

The work table is adapted to be reciprocated on the bed of the machine by hydraulic means, more particularly shown in Figure 6, comprising a cylinder 22 and a piston 23 slidably mounted therein. The piston is connected to one end of the table by means of a piston rod 24 which has a longitudinal bore 25 formed axially thereof and a radial bore 26 intersecting the axial bore. This radial bore, it will be noted, is in constant communication with the pressure chamber in one end of the cylinder. A plug 27 is threaded in the end of the bore 25 to prevent communication between the bore and the pressure chamber in the other end of the cylinder. A pipe coupling 28 is threaded in the opposite end of the bore 25 and a pipe 29 is threaded in the coupling for establishing connection with the work clamping pressure cylinder 30 carried by the table through the medium of the elbow 31 threaded in the end of the cylinder. Accordingly, when pressure is admitted to one end of the table cylinder to cause movement in one direction, it likewise will be admitted automatically to the work clamping cylinder.

Hydraulic pressure is supplied to the cylinder 22 through channels 32 and 33 connected to opposite ends thereof. The hydraulic pressure and thus the actuation of the table is controlled by a known hydraulic circuit comprising a series of valve mechanisms, illustrated diagrammatically in Figure 12, including a selector valve 34 and a pilot control valve 35. The selector valve 34 has leading thereto the feed pressure supply line 36 and the rapid traverse supply line 37. A return line 38 extends from the selector valve to the variable feed pump 39 by means of which the fluid is again forced under pressure into the channel 36. A second return line 40 extends from the selector valve to the reservoir 41' from which the fluid is again drawn by the rapid traverse pump 41 to supply channel 37. The selector valve is capable of reciprocating or longitudinal movement for reversing the connection between ports 32' and 33' leading to the channels 32 and 33 respectively, so that the fluid under pump pressure may be admitted to either end of the cylinder, with the opposite end coupled to the discharge line to effect movement of the table in opposite directions. In addition, the selector valve is rotatable to selectively couple the inlet side of the valve with either the feed line 36 or the rapid traverse line 37. It being desirable that these several couplings should be automatically effected and controlled, use is made of a pilot or control valve 35 having a trip portion or plunger 42 designed to be operatively shifted into different positions, as by dogs 43, 43' and 44, 44' on the table.

The valve 35 has coupled therewith the pressure or hydraulic inlet line 45 which may be shunted or directed by movement of the trip plunger 42 through line 46 or 47 to power actuate the selector valve rotor located at 49' to thereby change the rate of actuation of the table from a quick traverse to a feed or the reverse. Simultaneous with the coupling of either of these lines with pressure, the opposite line 48 or 49 is coupled with exhaust. The operation is such that upon admission of pressure to channel 48 the selector valve will be shifted to the left to effect a quick traverse forward movement of the table after which an admission of pressure to the channel 47 will change this rate to a feeding movement by rotating the selector valve through a predetermined angle. With the valve still in this rotated position the admission of pressure to the channel 46 will cause a longitudinal reciprocation which will cause a quick traverse return movement of the table; and a subsequent admission of pressure to the channel 49 will rotate the valve back to its starting position effecting a short feed movement just prior to reversing.

The trip plunger 42 is axially shiftable by the dogs 44, 44' to effect the oscillatory movements of the selector valve and rotatable by dogs 43, 43' to effect the reciprocatory movements of the selector valve. It will thus be seen that the table starting from an initial position at the right will rapid traverse forward toward the left until engagement with the dog 44 which will raise the plunger causing the table to feed. Continued movement of the table will bring the dog 43 into engagement with the plunger and rotate it to cause reverse movement of the table at a rapid traverse rate. This will continue until near the end of the stroke, when the upper dog 44' will strike the plunger to depress it and change the rate to feed, after which the dog 43' will rotate the plunger to initial position to cause a rapid traverse forward movement again and thus a repetition of the cycle.

Attention is here directed to the fact that the variable feed pump is a high pressure low volume pump while the rapid traverse pump is a low pressure high volume pump and since the work clamping cylinder is directly connected to one end of the table cylinder the pressure therein will be relatively low during rapid traverse movements of the table and high during feeding movements thereof.

Figure 4:
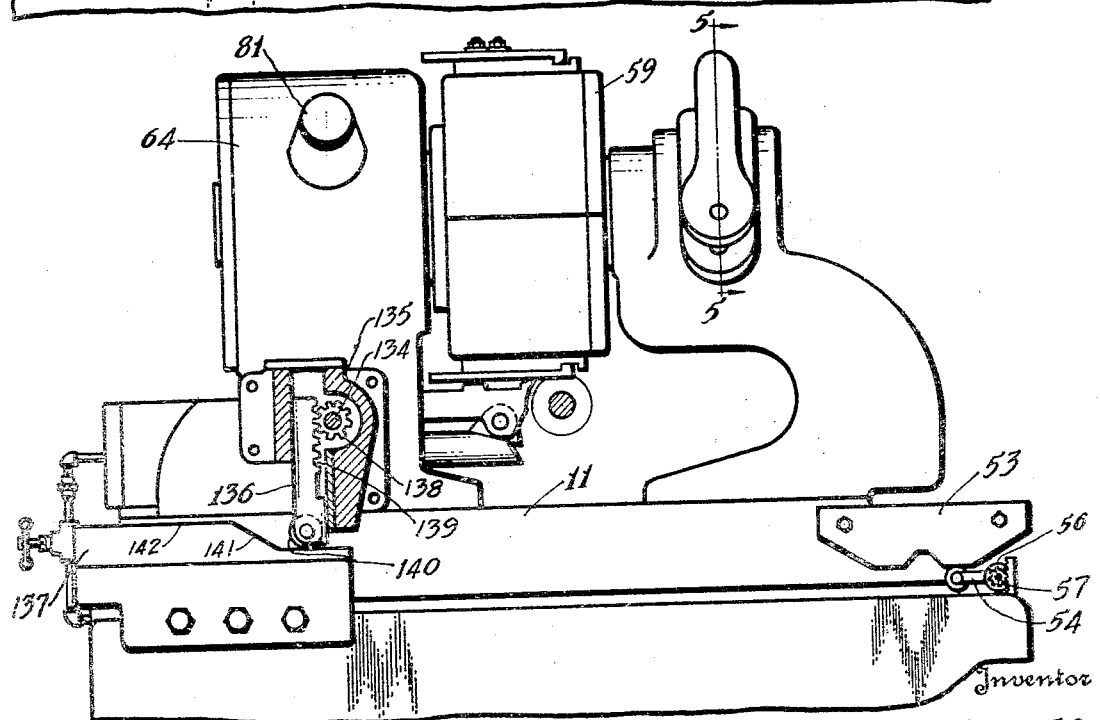
Figure 4 is an elevation of the machine from the rear as viewed on the line 4—4 of Figure 2.

The capacity of the variable feed pump 39 may be automatically varied by a pivoted lever 50 having a spring 51 which tends to maintain the lever in a central or neutral position at which time the discharge from the pump is zero. A cam or eccentric 52 is pivotally mounted in contact with the end of the lever for increasing the output of the pump and thereby increasing the rate of feed of the table; and the position of this cam may be automatically controlled by a template 53 (Figure 4) mounted on the side of the table for movement therewith engaging a pivoted arm 54 journaled in a bracket, not shown, attached to the base of the machine. A pinion 56 integrally connected with the arm 54 for movement about its axis, meshes with a rack bar 57, the lower end of which engages a pinion 58 (Figure 12) integral with the axis of the cam 52. This feed regulator is more particularly shown in an application of Ernst and Nenninger, Serial Number 326,840, filed December 18, 1928, and further description thereof is not deemed necessary.

The pressure differential between channels 36 and 38 may be automatically varied and controlled by a differential relief valve 147 shunted across the pump 39 so that increases in the cutting pressure will be offset by a greater hydraulic feeding pressure and thereby maintain the feed rate travel at a constant.

Figure 2:
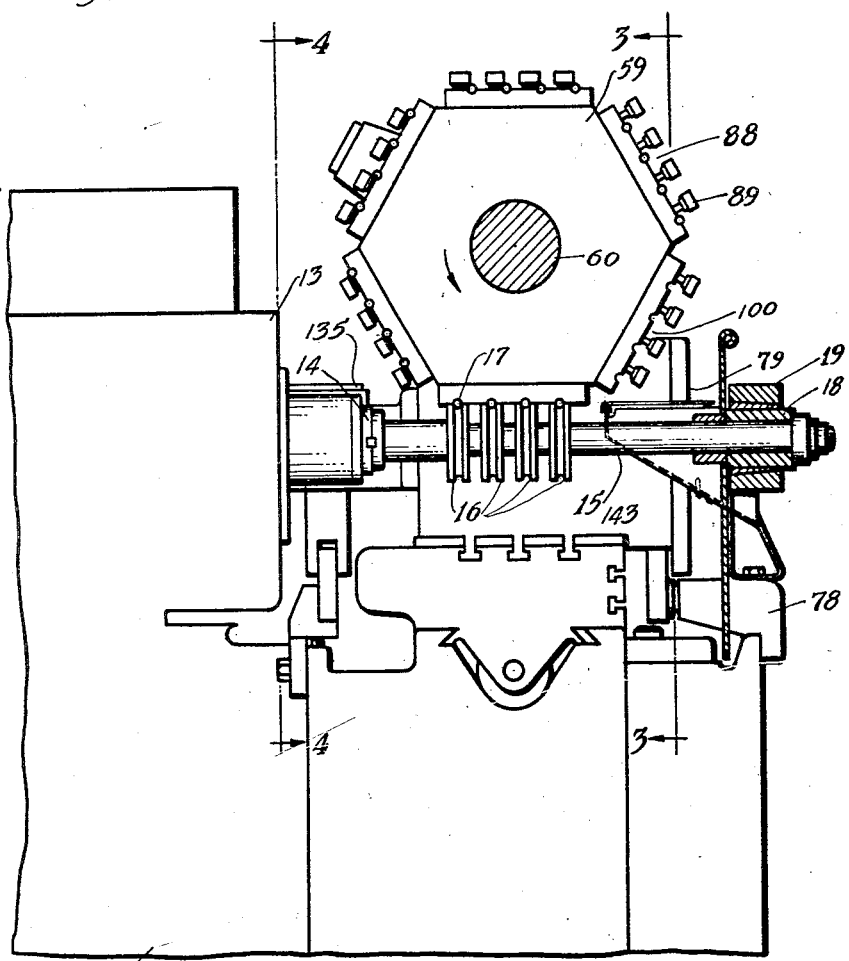
Figure 2 is a vertical section on the line 2—2 of Figure 1.

The work table 11 has mounted thereon a work support in the form of a rotatable or indexible drum 59 which has a plurality of flat faces formed about its periphery, each face being adapted to support a plurality of work pieces. In the present instance the drum is provided with six faces, as shown in Figure 2, and each face is adapted to support four work pieces. It will, of course, be understood that the number of faces may be varied, as well as the number of work pieces carried by each face. This work holder or drum is movable forward with the table to effect engagement of the work pieces 17 with the cutters 16 to effect a desired stock removal, as by cutting or other processing operation, after which the table is returned and the drum indexed to present another series of work pieces to the cutters.

Figure 10:
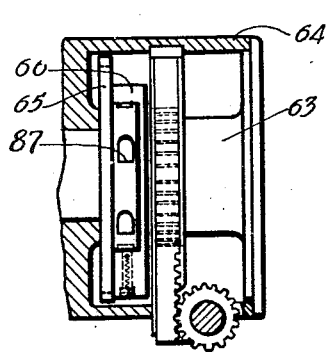
Figure 10 is a section on the line 10—10 of Figure 9.
Figure 3:
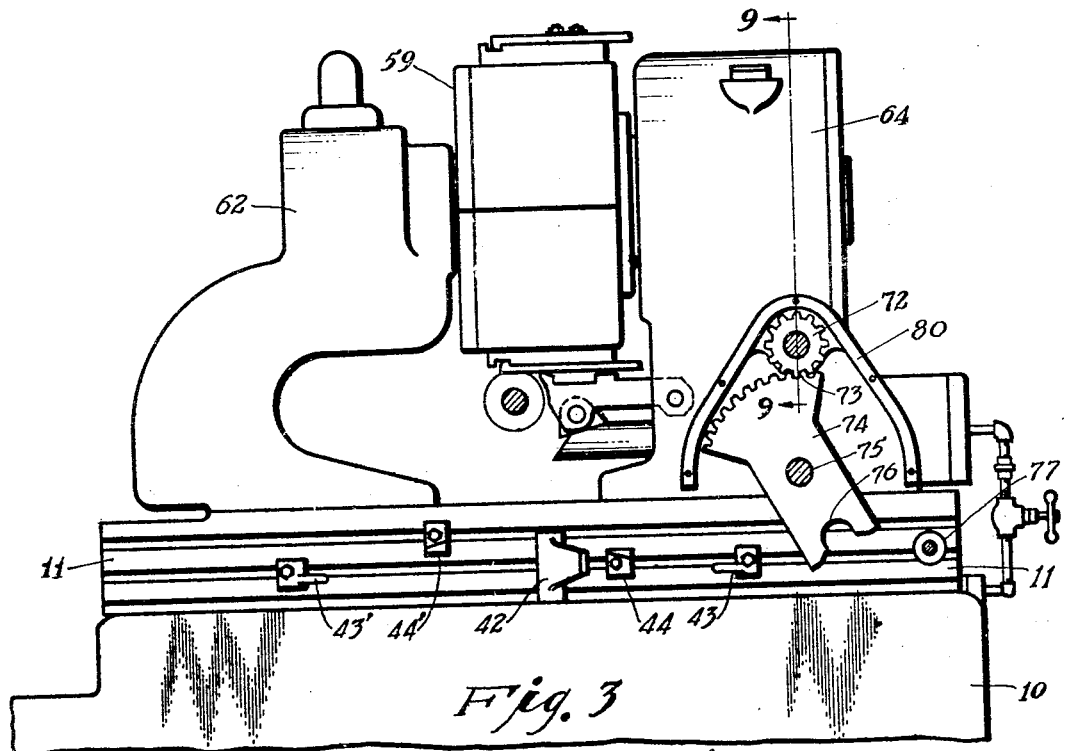
Figure 3 is an elevation of the machine as viewed on the line 3—3 of Figure 2.

The drum is secured to the shaft 60 which has an end portion 61 (Figure 7) projecting beyond the face of the drum to form a journal in a bracket 62 secured to the table. The rear end of the shaft is journaled at 63, as shown in Figure 10, in a housing 64 which encloses the indexing mechanism. This mechanism comprises an index plate 65 secured to the shaft 60 for rotation therewith and a carrier plate 66 mounted for free rotation on the shaft 60 carrying a radially extending spring urged pawl 67. The carrier plate has integrally formed therewith a gear 68 which meshes with a reciprocable rack bar 69 having a second set of rack teeth formed thereon at right angles to the first set for engaging a gear 70 secured to the end of a stub shaft 71 which is journaled in an exterior wall of the housing. The shaft has a projection on the other side of the wall for receiving a second gear 72 which meshes with a gear segment 73 (Figure 3) formed integral with a pivotally mounted Geneva plate 74. This plate is pivotally mounted on a stub shaft 75 projecting from the side of the housing and has formed in the lower end thereof an arcuate groove 76 for intermittently engaging a roller 77 pivotally supported by a bracket 78 secured to the bed of the machine. A cover plate 79 may be secured to a projecting flange 80 for protecting the parts from dirt and chips.

Figure 9:
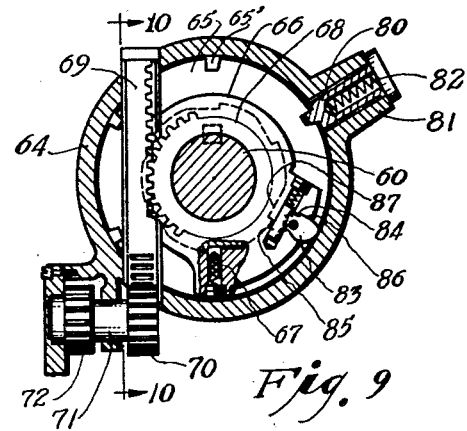
Figure 9 is a section on the line 9—9 of Figure 3 showing the work drum indexing mechanism.

The index plate 65 has formed in its periphery a plurality of equally spaced notches 65' which are slightly tapered outwardly to receive a similarly shaped locking bolt 80 which is reciprocably mounted in a projecting boss 81 cast integral with the housing 64. A spring 82 serves to constantly urge the locking bolt into engagement with the plate. In order to index the drum this locking bolt must be withdrawn and for that purpose a pivoted cam member 83 having a gear quadrant 84 is rotatably mounted on the carrier plate, the gear teeth meshing with a spring actuated rack bar 85. This rack bar tends to maintain the member 83 in a radially extending direction or position. The cam is limited against rotation in a counter clockwise direction beyond the point shown in Figure 9 by a shoulder 86 integrally formed on the carrier plate. The operation of the device is as follows: Upon return movement of the table, as to the right, when viewing Figure 3, the fixed roller 77 will engage the Geneva slot 76 causing rotation of the plate 74 which, through the segment 73 and gear 72, will cause rotation of the gear 70 and thereby downward movement of the rack bar 69. The rack bar, through intermeshing with the gear 68, will cause rotation of the carrier plate 66 in a counter clockwise direction. The amount of this rotation is substantially 90° which will cause the cam 83 to snap by the lock bolt 81 against the pressure of its spring so that upon return movement it will effect withdrawal of the bolt before the pawl 67, which also rotates with the plate, engages the next groove 87 formed in the periphery of the hub of the index plate 65. Upon return movement of the table the plate 74 will be rotated in a clockwise direction thereby causing upward movement of the rack bar 69 and clockwise rotation of the index plate whereby the parts will be returned to their normal positions, as shown in Figure 9.

Figure 7:
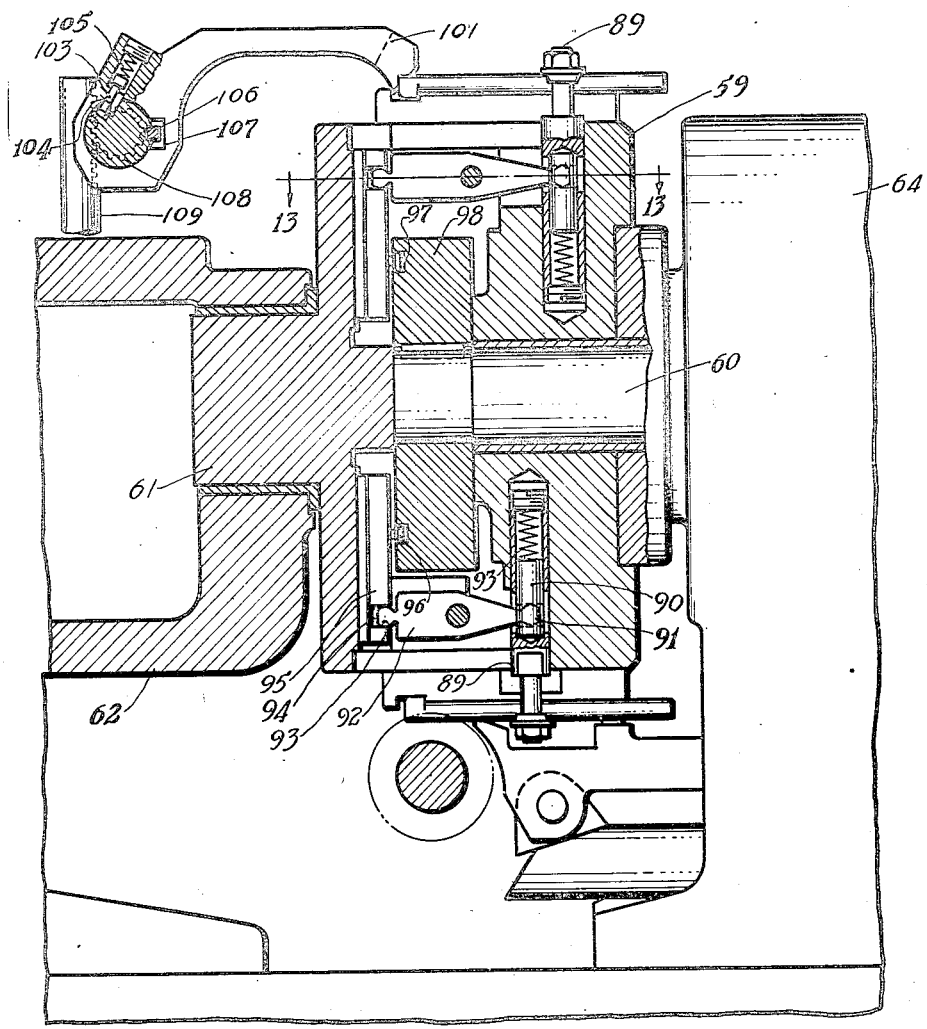
Figure 7 is a section through the work holding drum showing the initial clamping mechanism.
Figure 8:
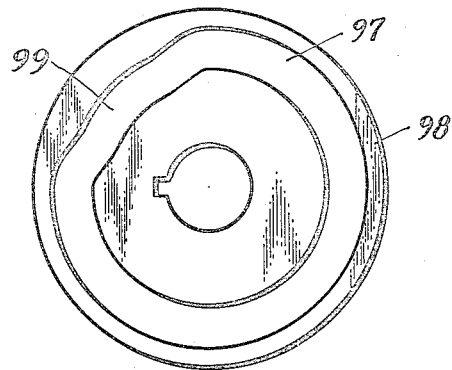
Figure 8 is a detail of the initial clamping mechanism control drum.
Figure 13:
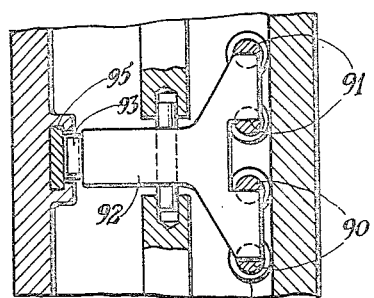
Figure 13 is a detail section on line 13—13 of Figure 7.

The work is loaded on the drum at a loading station indicated by the reference numeral 88 (Figure 2) after which each work piece is clamped by a separate plunger 89 upon return movement of the carrier plate. As shown in Figure 7, these plungers are formed with a hollow interior in which is reciprocably mounted a piston member 90 having a groove 91 receiving the ball shaped end of the actuating lever 92. The lever has sufficient width to operate all the plungers on one face as shown in Figure 13. A spring 93 is interposed between one end of the plunger and the end of the piston. These springs act as equalizers. The lever 92 is provided with a second ball shaped end 93' engaging a groove 94 in the reciprocable lever 95 having a cam roller 96 pivotally mounted thereon. This roller engages a cam groove 97 in a locking cam 98, shown more particularly in Figure 8. This cam is keyed to the shaft 60 for unidirectional rotation therewith. As shown in Figure 8, the cam groove 97 has a drop 99 formed therein which is so positioned as to effect an inward movement of only one of the levers 92 at any one time. This cam is rotatably mounted on the shaft 60 for oscillation between the loading station 88 and the unloading station 100. In other words, when the center of the drop is opposite to the unloading station 100 the plungers thereof are moved outward to release the work and the plungers at the loading station are drawn inward to clamp the newly positioned work. The cam rotates with the drum as it indexes so that the plungers, which have been moved outward while at the unloading station, will remain outward while being rotated to the loading station to thereby be in a position to receive work after which, upon return of the index carrier plate, the drop in the cam will move again from the loading station to the unloading station.

Figure 1:
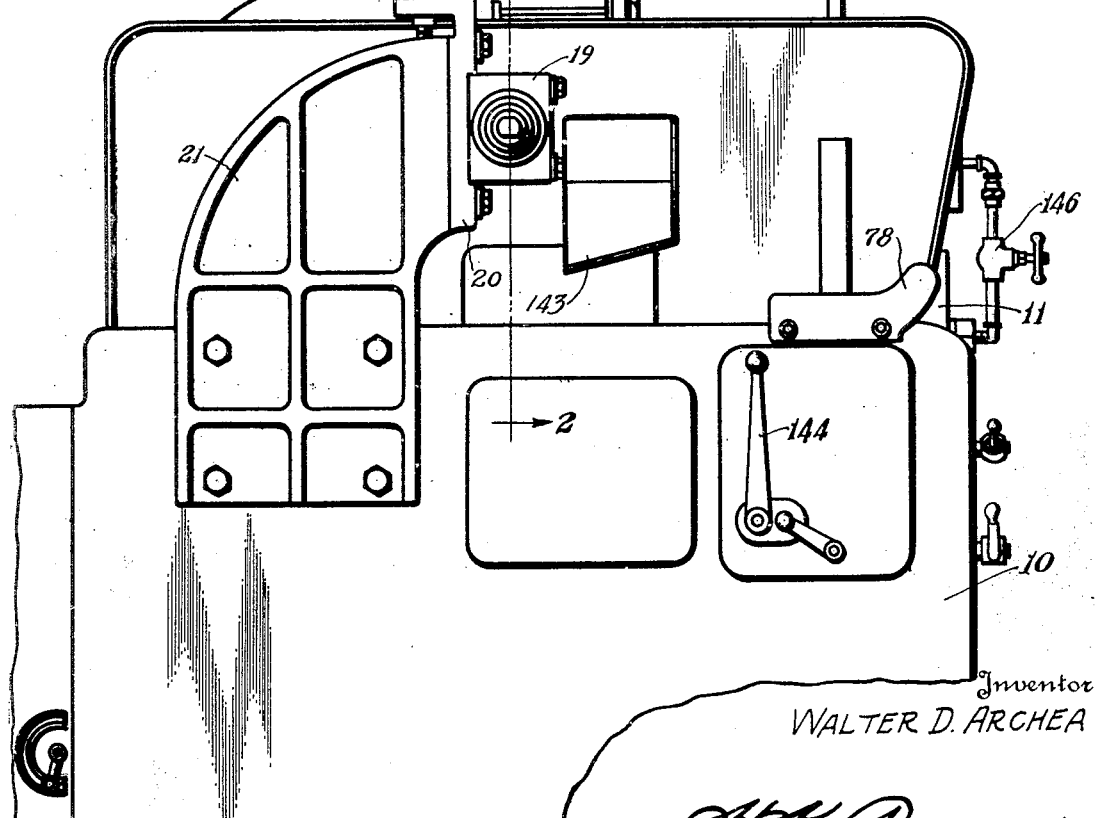
Figure 1 is a front view of a machine embodying the principles of this invention.

After the work has been placed in the grooves at the loading station and before it is clamped, means have been provided for insuring its proper positioning both longitudinally and angularly with respect to the work fixture, and thereby with respect to the cutter when it reaches the cutting position. To this end a plurality of fingers 101; one for each individual work piece, are pivotally mounted for simultaneous rotation by a shaft 102. It will be noted from Figure 1 that these fingers are bifurcated at the ends which is for the purpose of positioning either right or left hand work pieces. The work in the present instance comprises a brake rod having a wing portion 17', as shown in Figure 14, which is so united with the rod as to form rights and lefts and accordingly, either type may be milled without changing the fixture.

To insure that equal pressure is exerted on each work piece and thereby that each work piece is properly positioned the fingers are so mounted as to permit relative movement of one with respect to the other. Each finger has reciprocably mounted therein a plunger 103 which is perpendicular to a notched surface 104 formed in the periphery of the shaft 102. A spring 105 maintains the plunger 103 in constant engagement with the surface and has sufficient resistance that upon rotation of the shaft 102 motion will be transmitted through the springs to the fingers to thereby exert the nominal pressure necessary to rotate and position the work pieces. Upon meeting abnormal resistance the spring 105 will yield thereby preventing breakage of parts and since a plurality of these fingers are operated from a single shaft this construction makes it unnecessary to accurately position each finger on the shaft. A key 106 is secured in the shaft 102 and engages an enlarged keyway 107 formed in each of the fingers forming a lost motion connection thereby permitting the spring 105 to assume the load when rotating in one direction but insuring a positive return of the fingers upon rotation in the opposite direction. The shaft has an operating pinion 108 secured to the end thereof which meshes with a rack 109 reciprocably mounted in a housing 110, shown more particularly in Figure 5. The rack has a roller 111 rotatably mounted in the lower end thereof. A spring 112 is interposed between a shoulder 113 formed on the rack member and a shoulder 114 formed on the interior of the housing thereby constantly urging the roller 111 into contact with an actuating cam 115. This cam is rotatably mounted on a stud shaft 116 journaled in the forked end 117 of the housing. The cam has formed on its periphery an elevating portion 118 and a depressed portion 119. A pair of spaced rollers 120 and 121 are journaled therein for cooperation with fixed dogs 122. The rollers 120 and 121 are positioned in spaced parallel planes whereby the dog for one roller will pass the other roller without interference. Therefore, a dog may be positioned for cooperation with the roller 120 to rotate the cam in a counter clockwise direction to effect elevation of the roller 111 and actuation of the positioning fingers upon movement of the work table in one direction and another dog may be utilized for cooperation with the roller 121 to release the positioning fingers. It will be noted that the shape of the cam surfaces 118 and 119 is such that the cam is substantially self-locking after the dog has passed from contact therewith. In other words, after movement to a given position by one dog it will remain in that position until changed by the other dog. These dogs may be secured to a T-slotted member 123 carried by the column.

After the work has been initially clamped at the loading station it is indexed one station at a time with each reciprocation of the work table. Although the initial clamping mechanism is suitable for clamping work for ordinary purposes it has been found desirable to provide an additional clamping mechanism which will only be operated at extreme clamping pressures during the performance of the cut thus utilizing such energy only at the particular time it is needed and at the most suitable point of application thereby eliminating the necessity of maintaining a large number of clamping parts under extreme pressures for long periods.

The hydraulic clamp of the present invention is fixed with respect to the rotatable drum but adapted to cooperate with the work on each successive face as it arrives at the processing station thereby utilizing one high pressure clamp with a plurality of work holding faces. This clamp comprises a pivoted member 124 which is hinged in the housing 64 and projects forwardly therefrom underneath the work drum. This member has a plurality of pairs of clamping jaws 125 and 126 adapted to engage each work piece at two longitudinally spaced points for exerting enough pressure to securely clamp the work in its grooves. A pivoted wedge member 127 carried by the arm is engageable by the tapered end surface 128 of the reciprocable plunger 129. The plunger 129 has a piston 130 formed on its opposite end and slidably mounted in the cylinder 30. As previously mentioned, this cylinder is directly connected to the chamber in the right hand end of cylinder 22 whereby upon the admission of pressure to this chamber to cause movement of the table toward the cutter, pressure will simultaneously be admitted to the cylinder 30 to cause forward movement of the plunger 129 and thereby wedge the clamping member 124 firmly against the work. To insure free action of the member 124 it has a lost motion connection 131 at the point of hinging in the housing 64.

It will be recalled from the description of the hydraulic operation of the table cylinder that the table was moved forward at a rapid traverse rate by a low pressure large volume pump and upon approach of the work to the cutter this rate was automatically changed to a feed rate produced by a high pressure low volume pump. It will, therefore, be seen that the pressure in the operating cylinder will vary from a low pressure during the rapid approach of the work to the cutter to a high pressure during the cutting operation. Since the cylinder 30 is directly connected to the table operating cylinder this variation of pressure will be immediately communicated thereto with the result that the greatest clamping force will only be exerted during the actual cutting operation. Further, this feeding pressure will vary under the control of the differential valve with the cutting pressure. It will thus be seen that the greater the cutting force the greater the clamping action should be to prevent relative movement of the work with respect to the cutter and this is accomplished in the present instance by directly connecting the table operating cylinder with the clamp operating cylinder thereby insuring that each will increase in proportion to the other. Upon return of the table from the cutters the pressure in the right end of the cylinder will drop and to insure proper return of the plunger positive mechanical means have been provided for returning the plunger 129. The plunger is provided with rack teeth 132 which are engaged by a pinion 133 secured to the end of a shaft 134 journaled in the housing 64, one end extending into the housing 135 projecting laterally from the housing 64 for reciprocably mounting a rack bar 136 in cooperation with a template cam 137. The shaft 134 has a pinion 138 secured to the end thereof in mesh with rack teeth 139 formed on the plunger 136. This plunger has a roller 140 journaled in the end thereof contacting the contour of the cam 137. The contour of this cam is such that during return movement of the table the roller 140 rides up an inclined surface 141 thereby rotating the pinion 138 and shaft 134 in a clockwise direction, as viewed in Figure 4, causing rotation of pinion 133, (Figure 6) in a counter clockwise direction and movement of the plunger 129 to the right releasing the clamp member 124.

The complete cycle of operation of the machine is as follows: Assuming the work table in a return position the new work pieces have been loaded and clamped at the loading station while the finished work pieces have been released from the work drum at the discharge position, the discharging operation being completed at the initiation of the forward movement of the table. As the table moves forward the arm 74 engages the roller 77 to index the work drum, moving the finished work pieces to the discharging or unloading position and the unloaded face of the work holder up to the loading position. During this indexing movement the surface 142 prevents actuation of the hydraulic clamp until the drum has completed its index movement after which the surface 141 permits the plunger 129 to move forward to actuate the hydraulic clamp whereby the work pieces will be securely held during the cutting operation. Simultaneously during the clamping and cutting, the operator is positioning new work pieces in the empty grooves at the loading station. Since the work pieces are loosely placed in these grooves the clamping fingers are brought into action by a suitable positioning of a dog 122 to position and hold the work piece lightly against longitudinal movement during the reverse of the table. At the completion of the cutting operation suitably positioned dogs carried by the front of the table reverse the hydraulic circuit and the table returns at a high speed. During this return movement the arm 74 is again engaged by the roller 75 and rotated in an opposite direction to effect a return swing of the index pawl. During this return swing the cam 98 is rotated with the pawl and relative to the work holding drum thereby clamping the newly positioned work, which up to this time has been held by the positioning fingers, and simultaneously releasing the finished work pieces at the discharge position. Also, during this return movement the surface 141 of the template cam 137 effects positive withdrawal of the clamping plunger 129. As the table reaches the end of its return movement the discharged work pieces will drop down onto the slide or chute 143 and be conveyed to a suitable receiving receptacle at the front of the machine. The table will then reverse and repeat the cycle of operations.

A control lever 144 is pivotally mounted on the front of the machine and operatively connected with a slidable stop valve 145 (Figure 12) for stopping the table movement at any desirable time.

A valve 146 is also placed in the pipe 29 to disconnect the hydraulic clamp from the table cylinder to aid in setting up the machine.

Attention is invited to the fact that the pressure in the table cylinder and thereby in the clamping cylinder will not only vary due to variations in the cutting pressure caused by small differences in the thickness of the material being removed while the table is feeding at a constant rate but also to an increase in the feed rate as automatically effected by the feed regulator, while the thickness of the material remains substantially a constant. It should be apparent, however, that irrespective of the cause of the increase in the pressure in the table cylinder, whether by variation of one or the other of these conditions, a corresponding increase in the pressure in the clamping cylinder will automatically follow.

That which is claimed is:

1. A machine tool having a cutter, a reciprocating support, an hydraulically actuated clamp carried by the support, an hydraulic motor for effecting said reciprocation, an hydraulic connection between one end of said motor and the clamp, a source of pressure, means to admit pressure to the motor to cause a feed movement of the support in one direction and a simultaneous actuation of the clamp, and means to reverse the flow of fluid to the motor to cause a return of the support and the simultaneous release of the clamp actuating pressure.

2. A machine tool having a cutter, a slide movable past the cutter, an indexible work holder carried by the slide, power operated means for securing work to the holder, positioning means carried by the slide for locating work on the holder relative to the cutter, and dog actuated means carried by the slide for actuating said work positioner at a predetermined point in the cycle of operation of the machine.

3. A machine tool having a rotatable cutter, a reciprocating slide, a work carrying drum mounted on the slide for movement therewith relative to the cutter, means for automatically positioning the work on the drum including a plurality of yieldable fingers, and dog controlled means carried by the slide for effecting actuation of said fingers at a predetermined point in each cycle of slide movement.

4. A milling machine having a reciprocating table, means for effecting said reciprocation including a cylinder, a piston slidably mounted therein, a piston rod connecting the piston with the table, a work holder mounted on the table, an hydraulically actuated clamp carried by the table for securing work to the work holder, an axial conduit formed in the piston rod, a port connecting the conduit with one end of the cylinder, a pressure port in said end of the cylinder, and means coupling the conduit to said clamp whereby pressure admitted to said end of the cylinder to effect movement of the table will simultaneously be conducted to said clamp to effect actuation thereof.

5. In a milling machine having a reciprocating table, and a drum mounted on the table, an hydraulically actuated clamp for securing work to the drum during movement of the table in one direction comprising a reciprocal plunger, a cylinder, a piston secured to the plunger slidably mounted in the cylinder, a rack formed on said piston rod, a source of pressure, means for conducting pressure to the cylinder to effect movement of the plunger to clamp work to the drum, and additional means engaging said rack and operative during movement of the table in another direction to effect return of the plunger upon release of the pressure and thereby unclamping of the work.

6. In a milling machine having a bed, and a table reciprocably mounted on said bed, a work drum mounted on the table, contoured depressions formed in the drum for receiving work, means to position work in said depressions comprising an oscillatable shaft, a plurality of work positioning fingers mounted on said shaft, a plunger, means operatively connecting the plunger with said shaft, and dog operated cam means carried by the table for effecting reciprocation of the plunger and thereby oscillation of the shaft to position the work at a predetermined point in the cycle of table movement.

7. A machine tool having a reciprocating slide, rotatable cutting means associated with said slide, an indexible work drum having a plurality of work receiving faces carried by the slide, means to index the drum to present successively the work on each face to the cutting means, a pivoted clamp member adapted to co-operate with successive faces to secure the work during cutting, the pivotal connection of said clamp having lost motion therein whereby the clamp is free to adjust itself relative to the work, a wedge member engaging the free end of said clamp, and trip controlled hydraulically actuated means carried by the slide for reciprocating said wedge member to operate the clamp in timed relation to the reciprocation of said slide.

8. A machine tool having a rotating cutter, a reciprocating table, hydraulically actuated means for reciprocating the table relative to the cutter including a piston and cylinder, one of which is fixed and the other connected to the table, means to clamp work to the table for subjection to the cutter including a piston and cylinder, one of which is secured to the table and the other to said clamping means, an hydraulic channel connecting said cylinders in series, means to supply pressure to said channel to clamp the work and simultaneously feed the same past the cutter, and means to disconnect the pressure from said channel and simultaneously connect the pressure to the opposite end of the table cylinder to cause return movement of the table and release of said clamping means.

9. A milling machine having a rotating cutter, a reciprocating work table, means to effect said reciprocation including a piston and cylinder one of which is connected to the table, an hydraulically actuated work clamp carried by the table including a piston and cylinder, channel means connecting one end of the table cylinder to one end of the work clamping cylinder, a high pressure feed pump connectible to said channel means, a low pressure pump connectible to the opposite end of said table cylinder, said pumps being connectible in succession to the table cylinder to effect feed and rapid return movements of the work, and means to couple said channel to reservoir when the low pressure pump is coupled to the opposite end of the table cylinder whereby the work clamp cylinder may be connected to reservoir during return movement of the table and positive means for releasing said work clamp and forcing the fluid in the work clamp cylinder back to reservoir.

10. A machine tool having a rotating cutter, a reciprocating table, a work receiving drum indexibly mounted on the table, hydraulic means to feed the table relative to the cutter to effect machining of the work carried by the drum, cam actuated means for securing the work to the drum, means to index the drum on forward movement of the table to move unfinished work to a cutting position, a high pressure clamp opposite said cutting position, hydraulic means to effect actuation of the clamp after said indexing movement, means to automatically reverse the table after the machining operation, means to rotate said cam to unclamp the finished work during return movement of the table and a conveyor chute for receiving finished work from the drum upon unclamping thereof to convey the same from the machine.

11. In a milling machine having a bed, a table reciprocably mounted on said bed, a work drum mounted on the table, a plurality of work receiving faces formed on the drum, contoured depressions formed in each face for receiving the work, means to orient work in said depressions comprising an oscillatable shaft, a plurality of work positioning fingers mounted on said shaft, a plunger, means operatively connecting the plunger with said shaft and dog operated cam means carried by the table for effecting reciprocation of the plunger and thereby movement of the fingers to orient the work at a predetermined point in the cycle of table movement, additional dogs for releasing said plunger and resilient means operative to return the plunger and thereby the fingers after release thereof.

12. A machine tool having a reciprocating table, rotating cutters, a work drum indexibly mounted on the table, said drum having a plurality of work receiving faces thereon, work clamping means individual to each face carried by the drum, cam means for maintaining all of said clamping means except one in a clamping position, hydraulically actuated means for feeding the table to present the work on each face successively to the cutters, an additional hydraulically actuated clamp adapted to cooperate with the drum face being presented to the cutter, a source of pressure, means to couple the table and said additional clamp in series with the pressure for simultaneous actuation thereby, trip actuated control means for reversing the direction of table movement at the end of the feeding stroke and thereby releasing the pressure on said additional clamp, additional means dog actuated by the table during its return movement to rotate said cam to release previously finished work on one face and simultaneously clamp newly positioned work on an adjacent face, and a chute for receiving finished work from the drum and conducting it from the machine.

13. A machine tool having a cutter, an hydraulically actuated table movable transversely of the cutter, hydraulically actuated means carried by the table for securing a work piece thereto during movement of the table, means for translating the table including a piston and cylinder, one of which is connected to the table, a pump, delivery and return channels connecting the pump to the motor forming a closed circuit whereby the pressure in the delivery channel will rise to the value of the work resistance, and means coupling the delivery channel to the hydraulically actuated work clamping means whereby increases in the feeding pressure will be communicated to the work clamping means.

14. A machine tool having a cutter, a reciprocating work support, an hydraulically actuated clamp mounted on the work support for securing work thereto, hydraulically actuated means for feeding said work support at a substantially constant rate including a piston and cylinder, one of which is connected to the table, a variable delivery pump, delivery and return channels connecting the pump to the cylinder, and means coupling the delivery channel to the hydraulically actuated clamp whereby the pressure thereon will be automatically varied during changes in cutting pressure between the work and cutter and while the feed rate remains constant.

15. A machine tool having a cutter, a reciprocating slide, a work support carried by the slide, an hydraulically actuated clamp mounted on the slide for securing work to said support during movement of the slide past the cutter, a source of pressure, means to couple the pressure to said clamp upon movement of the slide toward the cutter, and cam means for positively retarding operation of the clamp by said pressure until a predetermined point in the cycle of slide movement has been reached.

16. A machine tool having a rotating cutter, a reciprocating work support movable transversely of the cutter, means for securing work to the table including an hydraulically actuated clamp, power actuated means for moving the table and work at a relatively fast rate to effect contact between cutter and work, and subsequently effect movement of the table and work at a relatively slow or feed rate, means to exert pressure on the clamp during the forward stroke of the table, and means automatically actuable to intensify the pressure during the feeding portion of the stroke whereby the high clamping pressure will be utilized for a minimum amount of time.

17. A milling machine having a rotating cutter, a work table movable transversely of the cutter, an indexible work support mounted on the table, a pivoted work clamp mounted on the table for successive cooperation with the work receiving faces of said support, power actuated means for moving the table and work up to the cutter at a relatively fast rate, feeding the work past the cutter at a relatively slow or feed rate and rapidly returning the work and table from the cutter, power operated means for exerting pressure on the clamp during the feeding stroke, means to reduce the pressure on the clamping means upon initiation of the return stroke, and positive means for withdrawing the clamp during return movement of the work table whereby said support may be indexed during the remainder of the return stroke.

18. A milling machine having a rotating cutter, a work table movable transversely of the cutter, an indexible support having a plurality of work receiving faces rotatably mounted on the table, hydraulically actuated means for effecting reciprocation of the table including a piston and cylinder, one of which is connected to the table, cam actuated means carried by the index head for clamping work pieces thereto, and additional clamping means carried by the table for successive cooperation with the work receiving faces for additionally clamping the particular work being operated upon by the cutter, hydraulically actuated means for operating said clamp including a piston and cylinder, a channel coupling the table cylinder with the clamp actuating cylinder whereby fluid pressure delivered to the table cylinder during the feeding stroke of the table will be simultaneously delivered to the clamp cylinder, and means in said channel to disconnect the clamp cylinder from the table cylinder.

19. A milling machine having a rotating cutter and a work table movable transversely of the cutter, an indexible work receiving drum mounted on the table with its axis parallel to the surface of the table and above the axis of said cutter whereby the cutter will cooperate with work mounted on the lower face of the drum, means to feed the table and thereby the work at a relatively fast rate up to the cutter and at a relatively slow rate during cutting, means to index the drum during movement of the table at the fast rate to present unfinished work pieces to the cutter, said indexing presenting an unloaded face in the work loading station whereby the operator may position unfinished work pieces thereon during the relatively slow movement, means to automatically reverse the direction of table movement after the completion of a cutting stroke, an oscillatable index pawl, means to return the pawl during the return movement of the table, a work clamping mechanism associated with the pawl and operative during the return movement thereof to clamp the newly positioned work and release the finished work, and means to reverse the direction of the table at the termination of the return movement.

20. In a milling machine having a bed and a table reciprocably mounted on said bed, a work receiving drum mounted on the table, a plurality of work receiving depressions formed about the periphery of the drum, means to position work rotatably in said depressions comprising an oscillatable shaft, a plurality of work positioning fingers mounted on said shaft and adapted to cooperate with a portion on said work pieces to rotate the same, a plunger, means operatively connecting the plunger with said shaft, an oscillatable cam carried by the table for actuating said plunger and dog operated means for oscillating said cam in timed relation to the reciprocation of the table whereby the work will be positioned at a definite point in the cycle of operation of the machine, and means subsequently effective to clamp the work in said predetermined position.

21. A machine tool having a cutter, a work table, hydraulically actuated means for feeding the table relative to the cutter including a piston and cylinder, one of which is secured to the table, hydraulically actuated means for securing the work piece to the table including a piston and cylinder, one of which is secured to the table, channel means maintaining connection between one end of the table cylinder and one end of the work clamping cylinder during all relative positions of the table, a source of hydraulic pressure and means for connecting said pressure to one end of the table cylinder whereby the table will be moved and the clamp actuated, and to the opposite end of the table cylinder whereby the table will be reversely moved and the pressure on the clamp will be released.

WALTER D. ARCHEA.